United States Patent

Ball

[11] Patent Number: 5,639,545
[45] Date of Patent: Jun. 17, 1997

[54] NON-BITUMINOUS SOUND DEADENING MATERIAL

[75] Inventor: Graeme Matthew Ball, Reservoir, Australia

[73] Assignee: Tri-Tex Australia Pty Ltd., Reservoir Victoria, Australia

[21] Appl. No.: 182,086

[22] PCT Filed: Jul. 23, 1992

[86] PCT No.: PCT/AU92/00375

§ 371 Date: Jan. 12, 1994

§ 102(e) Date: Jan. 12, 1994

[87] PCT Pub. No.: WO93/02021

PCT Pub. Date: Feb. 4, 1993

[30] Foreign Application Priority Data

Jul. 23, 1991 [AU] Australia .................................. PK7351

[51] Int. Cl.$^6$ .................. B32B 5/16; B32B 31/26; C08K 9/00
[52] U.S. Cl. .................. 428/323; 428/403; 428/460; 428/461; 428/463; 428/465; 428/467; 523/200; 523/205; 524/401; 524/425; 524/270; 156/308.2
[58] Field of Search .................. 523/200, 205, 523/351; 524/425, 401, 433, 442, 270; 156/308.2; 428/403, 460, 461, 463, 465, 467, 323

[56] References Cited

U.S. PATENT DOCUMENTS

| 3,424,270 | 1/1969 | Hartman et al. | 181/33 |
| 3,652,360 | 3/1972 | Hartman et al. | 156/244 |
| 4,191,798 | 3/1980 | Schumacher et al. | 428/95 |
| 4,222,924 | 9/1980 | Schumacher | 260/33.6 |
| 4,255,303 | 3/1981 | Keogh | 523/200 |
| 4,263,196 | 4/1981 | Schumacher et al. | 260/33.6 |
| 4,274,987 | 6/1981 | Augustyn | 524/425 |
| 4,373,041 | 2/1983 | Wood et al. | 524/77 |
| 4,379,190 | 4/1983 | Schenck | 428/95 |
| 4,386,169 | 5/1983 | Artur et al. | 523/200 |
| 4,403,007 | 9/1983 | Coughlin | 428/95 |
| 4,420,341 | 12/1983 | Ferrigno | 106/308 |
| 4,430,468 | 2/1984 | Schumacher | 524/109 |
| 4,434,258 | 2/1984 | Schumacher et al. | 524/13 |
| 4,434,261 | 2/1984 | Brugel et al. | 524/109 |
| 4,438,228 | 3/1984 | Schenck | 524/109 |
| 4,444,921 | 4/1984 | South, Jr. | 523/200 |
| 4,467,055 | 8/1984 | Machurat et al. | 523/200 |
| 4,472,545 | 9/1984 | Coughlin et al. | 524/13 |
| 4,480,061 | 10/1984 | Coughlin et al. | 524/13 |
| 4,496,670 | 1/1985 | Vas et al. | 523/205 |
| 4,598,105 | 7/1986 | Weber et al. | 523/215 |
| 4,704,238 | 11/1987 | Okuyama et al. | 264/41 |
| 4,789,586 | 12/1988 | Morimura et al. | 428/216 |
| 4,966,929 | 10/1990 | Tomoshige et al. | 524/71 |
| 5,149,732 | 9/1992 | Igarashi et al. | 524/315 |
| 5,276,258 | 1/1994 | Knobloch et al. | 524/114 |

FOREIGN PATENT DOCUMENTS

| 282544 | 8/1965 | Australia . |
| 405091 | 3/1966 | Australia . |
| 34339/68 | 9/1969 | Australia . |
| 498074 | 5/1976 | Australia . |
| 91964/82 | 7/1983 | Australia . |
| WO88/00221 | 1/1988 | Australia . |
| 1489806 | 7/1967 | France . |
| 61-209279 | 3/1985 | Japan . |
| 3-273296 | 3/1990 | Japan . |
| 8400-713A | 3/1984 | Netherlands . |
| 2031910 | 4/1980 | United Kingdom . |

OTHER PUBLICATIONS

International Search Report PCT/AU92/00375, dated Nov. 09, 1992.

*Primary Examiner*—Patrick Ryan
*Assistant Examiner*—Marie R. Yamnitzky
*Attorney, Agent, or Firm*—Merchant, Gould, Smith, Edell, Welter & Schmidt, P.A.

[57] ABSTRACT

A sheet or pad of sound deadening material comprising: (a) a polymeric component free of bitumen or asphalt such as natural or synthetic rubber, PVC, chlorinated polyethylene or ethylene vinyl acetate copolymer; (b) a filler such as calcium carbonate, barytes, talc, mica, magnesium carbonate or silica; (c) a compatibilising agent such as ricinoleic acid; and a tackifier such as pine rosin. Formulations may include a flame retardant, a polar additive, a polymer antioxidant, a heat stabilizer for PVC and a lubricant. Methods for forming such sheets or pads and for applying such sheets or pads to a metal panel are also provided.

34 Claims, No Drawings

NON-BITUMINOUS SOUND DEADENING MATERIAL

BACKGROUND OF THE INVENTION

1. Field of the Invention

This invention is concerned with improvements in or relating to sound deadening materials and generally relates to sound deadening material of the heat fusible type in sheet or pad form or for cold application employing adhesives for bonding.

Sound deadening materials of the heat fusible type are well known and used in large quantities in automobiles, dishwashing machines and other applications where it is desired to reduce the noise arising from resonant vibrations of the sheet metal panels.

Heat fusible sound deadening material in sheet or pad form, is most often adhered to metal panels by simply laying a pad of sound deadening material on a metal panel and heating the two together. This may conveniently be applied as the panels travel along a conveyor belt towards an oven. The self adhesive properties of a sound deadening material at elevated temperatures may be utilised to create a bond of one with the other.

Alternatively, an adhesive may be applied to either or both surfaces to enable a bond to be made at room temperature. In either case the bond needs to have high tenacity in order to meet the conditions of application in the factory and subsequent to that, e.g. up to 180° C. in the oven and later possible extreme cold in usage with the need to obviate the possibility of the sound deadening material breaking away with time and vibration. A requirement of such a sound deadening material is that it have excellent adhesion properties.

When a sound deadening material is applied to a surface which would be adversely affected by heating e.g. when laminated to timber for noise reduction in buildings, the method of laminating one to the other may be with adhesives applied in the usual manner. Likewise there are situations where it is simply more convenient to use adhesive bonding.

2. Discussion of the Prior Art

Well known heat fusible sound deadening materials are those based on bitumen and hence necessarily black in colour. Bituminous materials of this type are disclosed in Australian Patent Specification Nos. 34339, 405091, 498,074, 560006 and 606877. There are practical disadvantages in using such bitumen based materials which include their appearance and inferior sound deadening properties.

U.S. Pat. No. 3,424,270 and its division U.S. Pat. No. 3,652,360 are concerned with sound blocking structural elements for airborne sound. The Specifications disclose the use of a number of polymers including PVC and acrylonitrile rubbers. The combination of PVC and acrylonitrile rubbers is well known in the art and has been used since 1942. Indeed, L. A. Utrachi, Polymer Blends and Alloys, Hanser Publishers, 1989, pp 4, "The PVC/NBR blend was the first commercial thermoplastic blend in the modern sense of the word." U.S. Pat. No. 3,424,270 and its division U.S. Pat. No. 3,652,360 also disclose the use of natural rubber and barium sulphate composition in the cured and uncured form, as part of a sound deadening laminate. However, the efficiency of the materials provided by such proposals is, to some extent, limited by the amount of filler which can be incorporated into the formulation without compromising the adhesion and flexibility of the material in sheet or pad form.

U.S. Pat. No. 4,420,341, "Stabilized Surface Modified Fillers" proposes the treatment of various fillers including calcium carbonate with various saturated and unsaturated fatty acids generally in combination with each other. The Specification requires that the fatty acid is always used in combination with an antioxidant to prevent the degradation of the "surfied filler" both during and after addition of the fatty acid to the filler. In addition the technique disclosed in U.S. Pat. No. 4,420,341 teaches that it is advantageous to promote the acid filler reaction in the shortest time possible so that exposure to air and heat are minimised. The specification teaches that with very fine fillers it can be advantageous to also purge the filler before and during surfation with an inert gas such as nitrogen to prevent or reduce exposure to air before use. Such procedures are not suited to the economical production of sound deadening materials in high volumes.

A number of prior art patents disclose the use of esters of ricinoleic acid as coupling agents applied to fillers including calcium carbonate. U.S. Pat. No. 4,704,238 uses a number of aliphatic alcohol/fatty acid esters including esters of ricinoleic acid. UK Patent Application GB 2 031 910 A, discloses the use of fatty acid esters of mono and polyhydric alcohols as coupling agents particularly for calcium carbonate and polymeric materials. Included among the fatty acids for the manufacture of such esters is ricinoleic acid. However, none of these prior specifications show the use of such techniques to produce superior sound deadening materials.

French Patent 1,489,806 discloses a process for improving reinforcing fillers for elastomers in which very fine fillers show improved dispersion following treatment with dispersing agents. Various dispersing agents are proposed. The specification teaches that the properties of reinforcing fillers are more favourable when their fineness is greater. However, the specification is specifically directed to silica and silicate fillers and does not address the suitability of such treated fillers for use in sound deadening materials. Moreover the treatment procedures exemplified are not suited to the economical production of sound deadening materials in high volumes.

SUMMARY OF THE INVENTION

It is an object of this invention to provide in one embodiment an improved sound deadening material in sheet form which exhibits superior sound deadening properties and which contains no bitumen or asphalt.

The present invention accordingly provides, in one embodiment, a sound deadening material in sheet or pad form comprising:

a polymeric component substantially free of bitumen or asphalt;

a filler;

a compatibilising agent; and a tackifier.

A sound deadening material according to the present invention may also include a flame retardant, a polar additive, a polymer anti-oxidant, a heat stabiliser for PVC, a lubricant and optionally other additives.

The present invention also provides, in another embodiment a method for forming a sound deadening material in sheet or pad form comprising the steps of:

compatibilising a filler by treatment with a compatibilising agent to form a pre-blend;

mixing the pre-blend with other ingredients including a polymeric component substantially free of bitumen or asphalt and a tackifier to form a mix; and forming a sheet or pad from said mix.

The present invention also provides, in yet another embodiment, a method for applying a sound deadening material to a metal panel comprising the steps of;

forming a sheet or pad of sound deadening material by compatibilising a filler by treatment with a compatibilising agent to form a pre-blend, mixing the pre-blend with other ingredients including a polymeric component substantially free of bitumen or asphalt and a tackifier to form a mix, and forming said sheet or pad from said mix;

laying said sheet or pad on a metal panel; and heating said metal panel and said sheet or pad whereby to bond said sheet or pad to said metal panel.

The polymeric component of a sound deadening material according to the present invention may be an elastomer. The elastomer may comprise a rubber component and both natural and synthetic rubbers have been found suitable for use as the rubber component in accordance with the invention.

Acrylonitrile butadiene rubber (also referred to herein as nitrile rubber), butyl rubber either straight, chlorinated or brominated, ethylene propylene rubber, polychloroprene, polysulphide rubber or styrene butadiene rubber are preferred synthetic rubbers for use in accordance with the invention. Acrylonitrile butadiene rubber (NBR) containing 25 to 50% acrylonitrile and having a Mooney viscosity of 20 to 80 is particularly preferred. NBR may be employed at 0 to 17% and in the preferred formulations is used at 4 to 10%.

We have found that polyvinyl chloride (PVC) when used as a polymeric component in accordance with the invention, enhances the sound deadening efficiency of a heat fusible sound deadening material in the higher temperature region, imparts flame retardant properties to the formulation and may increase slump. The preferred PVC contains 14% vinyl acetate as the co-monomer and has a K-Value of 45. Such a PVC resin shows good long term heat stability when suitably stabilized, preferably with lead stabilizers. PVC may be used in formulations where there is the requirement of good sound deadening efficiency and slump and where there is no objection to its use.

Any low K-value PVC may be employed as a polymeric component in accordance with the present invention. The PVC is preferably co-polymerised with vinyl acetate to give a degree of internal plasticisation, increased capacity for high filler loading and greater heat stability. Chlorinated polyethylene can also be employed. The particularly preferred grade of PVC is Lacovyl SA 6001 from Atochem France. This has a K-value of 45 and a vinyl acetate content of 14%. When PVC is used in the formulations of the invention it is preferably present in an amount of not more than 18% by weight of the total formulation. In the most preferred formulations PVC, when present, is used at a level of 3 to 12% by weight of the formulation.

Any of the known heat stabilizers for PVC may be used in accordance with the present invention. The most efficient stabiliser and the preferred type is based on basic lead sulphate in a non-dusting form. This is preferably employed at a percentage of 0.5 to 1.5%, when PVC is present in the formulation.

Other polymers including chlorinated polyethylene or high vinyl acetate content (i.e.28% or greater VA content) ethylene vinyl acetate, may also be used as a polymeric component in accordance with the present invention. In general it has not been found that the sound deadening efficiency with such polymers is as great as that with formulations containing PVC. However, such formulations are generally still superior to the sound deadening efficiency of the bituminous materials previously used.

Any powder form filler may be employed in accordance with the invention. The preferred filler is calcium carbonate (calcite, whiting, limestone, chalk) in powdered form, which may be from any source, cost being the main determinant. Other powder form fillers may be employed including barytes, talc, mica, magnesium carbonate, silica or mixtures thereof. However, it has been found that the best balance of properties and lowest. cost is obtained with calcium carbonate. The filler level is preferably between 60 and 90% by weight of the total formulation. In the particularly preferred formulations calcium carbonate is used in an amount of from 79 to 89% by weight of the total formulation.

Each ingredient plays an important role in the properties of a particular heat fusible sound deadening material formulation made according to the present invention. For example, the use on the filler of a compatibilising agent applied from 0.1 to 5% by weight of the total formulation, enables the use of higher volume fractions of filler while still retaining suitable processing characteristics and also enables improved hot slump, impact strength and cold bend resistance, compared with formulations without such a compatibilising agent. Higher levels of filler are also important for cost, a big consideration for such a product. However, it is not necessary according to the present invention to use antioxidants or inert atmospheres with the fillers in the manner proposed by the prior art referred to above in order to achieve markedly superior properties in sound deadening materials free of bitumen and asphalt.

Riconoleic acid is the preferred compatibilising agent according to the invention. Ricinoleic acid of low acid value namely 130–145, has been found to be particularly preferred for use as a compatibilising agent according to the present invention.

Ricinoleic acid can be made with different levels of acid value with a common form having an acid value in the range of 170–186. For purposes of clarity we here give the designation to that common form with the higher acid value 'HAV', whilst the lower acid value form we here designate 'LAV'. The LAV form we have found to be more efficacious and is the particularly preferred type for use in accordance with the present invention.

The particularly preferred ricinoleic acid LAV referred to herein has the following typical analysis:

| Appearance | Pale amber liquid, cloudy when cold, which deposits a small amount of related fatty acid on aging. |
| --- | --- |
| Colour (Gardner) | 7 max. |
| Acid value | 130–145 |
| Water content % | 1.5 max |
| Hydroxyl value | 145–160 |
| Iodine value | 80–90 |
| Saponification value | 180–195 |

By way of contrast the following is a typical analysis for Ricinoleic acid HAV:

| Appearance | Amber liquid with some 'foots' cold |
| --- | --- |
| Acid value | 170–186 |
| Water content % | 3 max |
| Iodine value | 80–90 |
| Saponification value | 180–195 |

The ricinoleic acid is applied to the filler(s) in a suitable mixer, to form a pre-blend. The mixer is preferably of a type which elevates the temperature of the blend to between 40° and 110° C. in order to shorten the reaction time of the two ingredients. The pre-blend is made with only the filler(s) and the riconoleic acid being present. The pre-blend is later blended with the remaining ingredients of the formulation.

In one alternative method also suitable for use in accordance with the present invention, the filler and ricinoleic acid may be blended together at ambient temperatures with a reaction period being allowed before use sufficient for the reaction between these two ingredients to have occurred. The reaction period required should be determined by testing.

The reaction is believed to be that of the acid portion of the molecule of the ricinoleic acid with the filler and acts to facilitate the compatibilising or coupling of the filler with the elastomeric and any polymeric ingredients. Unless such a reaction is allowed to occur with the filler, the acidic nature of riconoleic acid potentially could react with the polymeric ingredients to the possible detriment of those ingredients. Furthermore the reaction product of riconoleic acid and, for example, calcium carbonate, facilitates "wetting" of that calcium carbonate by the polymeric ingredients.

It has been found that if the riconoleic acid is simply added to the total mix (and not pre-blended with the filler), the resultant product is difficult to process, dry in appearance, brittle, has poor hot slump and lower bond strength for a given formulation.

Other compatibilising agents may be employed such as the Titanates and silanes. We have found the greatest efficiency and lowest cost to date with riconoleic acid LAV. When employed in the formulations made under this invention, it is preferably used at the rate of 0.5 to 2.5% of the total formulation.

A tackifier of the pine rosin type, hydrocarbon resin type or coumerone indene type may also be used in accordance with the present invention. Such tackifiers appear to act on the rubber component in a similar manner to that of an extender or processing oil to aid flexibility as well as to tackify. Furthermore, the preferred pine rosin materials lower the melt viscosity of the formulation and add substantially to the sound deadening efficiency.

The tackifier may also act to increase the hot slump of a heat fusible sound deadening material. When a tackifier is used in increasing amounts in some formulations, an increasing degree of slump may be observed.

Beyond a certain percentage of tackifier relevant to the formulation concerned, the heat fusible sound deadening material may become too tacky and floppy to employ readily, yet the material still retains good sound deadening properties.

Tackifiers may be used to increase the bond to metal or to the laminating ply at the elevated temperatures employed for adhering heat fusible sound deadening materials. Preferably they are not tacky at room temperature. They also have the effect of extending the rubber component due to their good compatibility with rubber, thus increasing the rubber like properties. The tackifier preferred for use in accordance with the present invention is a pine rosin type also variously known as tall oil rosins, pine oleoresins and their esters.

Within the range of pine rosins and their esters some show an increase in slump for a given formulation whilst others exhibit little of this effect. There are also some which cause the heat fusible sound deadening material to become weak in extension and very floppy for a given formulation. Furthermore there are those which enhance the cold bend resistance and impact strength more than others. The two grades which have been found to impart the best balance between slump, bond strength, impact strength, extensibility and sound deadening efficiency, are Pinechem 240 and Pinerez 1200 NC, from Eka Nobel. The tackifiers are preferably used at a percentage of 2 to 9%, most preferably 5 to 8%.

Hydrocarbon resins, frequently made as a by-product in the petrochemical industry, are similarly beneficial as tackifiers according to the present invention, but do not exhibit the same increase in sound deadening efficiency.

Whilst liquid plasticisers may be employed to increase plasticity, there is a concern that they could leach out or volatalise with time to cause e.g. window-fogging in cars.

Polar additives such as carboxylic acids, added to the sound deadening material composition at the compounding stage (as opposed to the compatibilising agent which is pre-blended with the filler) have been found to assist in sound deadening efficiency, particularly in enhancing lower temperature sound deadening performance. Oxalic acid is a preferred carboxylic acid and has the effect of increasing the peak sound deadening efficiency and in some formulations, shifting that peak to a lower temperature. Thus such substances may be employed as a means to control the temperature level where peak efficiency occurs e.g. for different climatic zones or different application areas. Similar effects in shifting the curve and sound deadening enhancement may also be obtained from other substances such as phthalic, malonic or maleic acid or their anhydrides. Where the acidity of such substances is of concern in a formulation, this can be overcome through the use of a suitable quantity of lime in the formulation.

Atactic polypropylene, a by-product from the manufacture of isotactic polypropylene may be employed as part of the formulation of a sound deadening material according to the present invention. When employed, atactic polypropylene enhances hot slump, lowers melt viscosity and assists in the production of smoother sheet. It also tends to lower the temperature at which peak sound deadening efficiency occurs.

Lubricants may be used to improve the hot slump and to generally improve the processing of a sound deadening material. Waxes, stearic acid (used as part of the main mix as opposed to the compatibilising agent which is pre-mixed with the filler) and calcium stearate as well as other well known fatty acid ester lubricants may be employed, but are not essential.

Flame retardant properties may be imparted by the use of antimony compounds or halogenated chemicals or with the use of alumina tri-hydrate. The latter is preferred for reasons of cost and toxicity. When desired, up to 30% of the filler may be replaced with alumina tri-hydrate. If there is no PVC present in the formulation to otherwise confer a degree of flame retardancy to the formulation, alumina tri-hydrate is preferably used when flame retardancy is required.

An anti-oxidant effective for the rubber component of the formulation may also be used in accordance with the present invention. The hindered phenols may be used for such purposes and act to lessen the hardening caused by oxidation during processing and by aging, which could otherwise lead to embrittlement of the sound deadening material. It is not essential but long term properties are improved by its presence. A preferred anti-oxidant is 2,4-bis(n-octylthio)-6-(4-hydroxy-3,5-di-tert-butylanilino)-1, 3,5,-triazine, also known as Irganox 565 from Ciba Geigy. If used it is employed at the rate of 0.01 to 0.5% of the overall formulation.

In one particularly preferred form the invention comprises a sound deadening material composition including PVC (optionally containing vinyl acetate as a co-monomer) (in a proportion of 0 to 15% by weight), acrylonitrile butadiene rubber (in a proportion of 0 to 15% by weight), a compatibilising agent (optionally riconoleic acid LAV) (in a proportion of 0.1 to 5% by weight), a filler (optionally calcium carbonate) (in a proportion of 40 to 90% by weight), alumina tri-hydrate (in a proportion of 0 to 30% by weight), tackifier (optionally pine rosin) (in a proportion of 4 to 10% by weight), Oxalic acid a proportion of 0 to 0.5% by weight), anti-oxidant (optionally Irganox 565) (in a proportion of 0 to 1.0% by weight), a heat stabiliser for PVC, if present, (in a proportion of 0.3 to 1.5% by weight) and a lubricant if required (in a proportion of 0 to 4% by weight).

Sound deadening materials according to formulations provided by the present invention may be prepared by pre-blending the filler and compatibilising agent in a mixer such as a ribbon blender and subsequently mixing the pre-blend so formed with the other ingredients in an intensive mixer such as a mixer where the ingredients are mixed, melted and homogenised. This may be followed by extrusion and calandering to convert the melt into sheet form. Other methods of forming sheets of sound deadening material according to the present invention include direct extrusion or calandering of sheet.

The use of relatively thin steel panels in automobiles, leads to an unacceptable level of sound transmission without the use of a sound deadening material. In the automotive industry, weight is a very important factor effecting fuel consumption amongst other things. Hence a heat fusible sound deadening material which has greater efficiency is clearly beneficial. This is especially true for a heat fusible sound deadening material having superior sound deadening efficiency over the temperature range at which the sound deadening material is to be used.

Heat fusible sound deadening material of the bituminous type made to Australian Patent Specification No. 606877 (in the name of Sound Deadeners Australia Pty. Ltd., —now known as Tri-Tex Australia Pty. Ltd.) has a sound decay rate measured by the Geiger Thick Plate Method, under Australian Standard K154.10, of at least 27 dB per second at 21° C., for 2.5 mm thickness of sound deadening material. One Australian automobile manufacturer has a requirement of a minimum decay rate of 15 decibels per second at 21° C. and a minimum of 6 decibels per second at all temperatures from −1° to +38° C. for heat fusible sound deadening material of 2.0 mm thickness.

Heat fusible sound deadening materials have been made in accordance with the present invention which have a minimum decay rate in excess of 27 dB per second at 21° C. for 2.0 mm thickness of sound deadening material when measured under the same test.

In the case of formulations designed for warm climates or usage, the sound deadening level exhibited by materials made in accordance with the present invention has also exceeded 27 dB/sec for the whole range from 21° to over 35° C., a temperature range which would appear more applicable to warm climates such as Australia. By way of contrast, heat fusible sound deadening material made in accordance with Australian Patent Specification No. 606877, in the range 21° to 35° C. has been found to measure approximately 27 to 10 dB/sec. decay rate respectively. In the case of formulations designed for cool climates or usage, the sound deadening level of materials made according to the present invention have shown values, which are also in excess of 27 dB/sec., between 10° and 25° C.

Heat fusible sound deadening material can more realistically be assessed on the basis of sound decay rate in decibels for a certain mass of sound deadening material applied to the same Geiger Thick Plate using the same Method of test. Mass is an important consideration in automobiles and many other applications and this method takes into account the efficiency of the heat fusible sound deadening material with respect to mass.

One automobile manufacturer requires the mass of sound deadening material to be calculated back to an application weight of 2.4 kg/sq.m., which corresponds to 600 g. being applied to the Geiger Plate of 500×500 mm. Under this method the above specified 15 dB decay rate for nominal 2 mm thickness heat fusible sound deadening material translates to approximately 10 dB/sec. at 21° C. This method is employed in the later results simply to give consistency to those figures.

Australian industry has employed bitumen based heat fusible sound deadening material having a Sound decay rate of approx.20 dB/sec. at 21° C., falling to approximately 6 to 8 dB/sec. at 43° C. when calculated back to 2.4 kg/sq.m.

Some formulations produced according to the present invention have a rating of approximately twice those values at 21° C. Furthermore, hot climate formulated heat fusible sound. deadening material made according to this invention have produced higher sound deadening efficiency results for the range of 30° to 40° C., than the above mentioned bituminous material at 21° C. Additionally, because the materials produced in accordance with this invention do not contain bitumen, any colour may be produced with suitable pigmentation, thus e.g. enabling colour coding.

Other application areas for such sheet made in accordance with this invention are for reducing the level of noise in air-conditioning ducting and to reduce the noise produced by the "drumming" of rain on metal roof decking or noise generation and transmission of metal siding on buildings and machine housings.

The previously known bituminous materials referred to above show reasonable sound deadening efficiency at low temperatures e.g. 10° C. but generally show a considerable reduction in sound deadening efficiency from their commonly quoted value at 21° C. to their value at say 40° C. Formulations of heat fusible sound deadening material designed for warmer climates and made according to the present invention have shown a sound deadening efficiency at 40° C., at least equal to their value at 21° C.

Dishwashing machines frequently operate at temperatures of 65° C. and higher. The previously known bituminous sound deadening material has only very low sound deadening efficiency at such temperatures. In accordance with the present invention material can be "tailor made" to better suit the temperature range that requires the maximum level of sound deadening efficiency. The peak performance of sound decay versus temperature can be varied. through changes in formulation.

In the manufacture of dishwashing machines more efficient sound deadening is constantly sought because of space limitations and the fact that often the machine is in the home. The considerably greater efficiency of some formulations provided by the present invention at higher temperatures compared with the prior art bituminous materials, can lead to the use of lower thickness of heat fusible sound deadening material and consequent cost saving.

Greater efficiency in heat fusible sound deadening material has been obtained according to the present invention through the use of different ingredients or in a different combination to those previously employed in the manufacture of such sound deadening materials. An essential part of the formulation relates to the use of agents which assist in giving bonding, coupling and wetting (i.e. compatibilising) between the non-binder ingredients (e.g. fillers and pigments) and the binder ingredients (e.g. rubber, tackifiers, polymers, etc.) The use of compatibilising agents particularly enables the employment of higher volume fractions of fillers (approximately 46 to 80% by volume or 70 to 90% by weight for materials according to the present invention) while still retaining good processing characteristics and toughness.

The use of higher volume fractions of filler leads to better sound deadening efficiency for a given system. Additionally the use of ingredients which are polar such as PVC, pine rosin and oxalic acid has been found to lead to greater sound deadening efficiency. This increase in efficiency is believed to be due to the ability of such ingredients to aid in the conversion of the mechanical energy of sound to that of heat. Without the use of compatibilising agents, formulations provided by the present invention with their high volume fraction of fillers would be stiff, brittle and difficult to manufacture by known methods, would show poor hot flow and tend to have inferior bonding to steel when suitably heated.

One known requirement for a heat fusible sound deadening material for use in the auto industry is known as the "heat flow test", which is referred to herein as the "hot slump" test.

Under the hot slump test a flat strip of heat fusible sound deadening material is placed on a steel sheet, bridging over a half circle groove of 25 mm radius and the whole is heated for 30 minutes at 160 deg. C. After cooling, not less than 95% of the contact face of that heat fusible sound deadening material must be firmly adhered to the steel including the radius.

This method tests both the adhesion to the steel and the ability of the heat fusible sound deadening material to "slump" to conform to the radius, without rupture, under its own weight. When required, heat fusible sound deadening material made in accordance with the present invention passes this test.

Different automotive manufacturers have different variations of this test, however each demand a high degree of adhesion and the ability to slump to conform to shape. The balance between the various ingredients is important to be able to pass this test.

Australian Patent Specification No. 34339 discloses the use of an adhesive ply in order for the bond of the bituminous heat fusible sound deadening material to the steel to better withstand shock at low temperatures. It is a well known procedure in the plastics and rubber industries to laminate different materials together in order to obtain an enhancement of properties. Refrigerator lining sheets have been made in a laminated form for many years, to obtain the toughness of the polystyrene butadiene substrate with the gloss and better resistance to foodstuffs of biaxially oriented G. P. polystyrene.

In a similar manner, when extremely high bond strength and/or resistance to cold shock is required, an adhesive laminate (of a different nature to that in Australian Patent Specification No. 34339), may also be employed in accordance with the present invention. This laminate or ply may be applied to the heat fusible sound deadening material at the time of manufacture and on the side of the sheet that is subsequently to be bonded to another substrate, frequently sheet metal.

The lamination of such an adhesive layer to the sound deadening material may conveniently be applied in film form or by the known extrusion methods or by other known coating methods. Suitable polymers for laminating are of the ethylene acrylic acid copolymer type. We have found that an adhesive film laminate thickness as low as 5 micron is sufficient with such materials.

By applying such a laminate the strength of the bond between metal and sound deadening material may be increased to the point where repeated blows at −14° C. will not dislodge the heat fusible sound deadening material from the steel substrate. Such a laminate is not sticky at room temperature and also serves as a useful means of obviating blocking of sheets of heat fusible sound deadening material, when stacked together under high loading at 45° C.

We have found that it may be convenient to employ a film which is itself a co-extruded laminate, to laminate onto the heat fusible sound deadening material of this invention. Such a co-extruded film may consist of a thin layer of ethylene butyl acrylate copolymer on either side of polyethylene, the latter acting as the cheaper "carrier" film for the more expensive adhesive film layers. Apart from the aforementioned advantages, it has been found that such a film laminate can increase the sound deadening efficiency of a heat fusible sound deadening material, particularly at lower temperatures.

A further requirement for a heat fusible sound deadening material for the auto industry is to have sufficient impact strength and resistance to cold bending such that on a cold day breakage will not occur at the time of application, due to handling at temperatures as low as 5° C. An automotive requirement is for a strip 50 mm×150 mm of sound deadening material to be conditioned at −10° C. for four hours and then slowly bent 180° around a similarly conditioned 50 mm diameter mandrel without breaking or cracking. When required sound deadening material made in accordance with this specification passes this test.

DETAILED DESCRIPTION OF THE PREFERRED EMBODIMENTS

It is convenient to further describe the invention in relation to the following examples showing various embodiments of the present invention in the form of typical and preferred formulations showing a typical range of ingredients which may be used in accordance with the present invention. In each case one particularly preferred form of the formulation is also given.

Test runs were conducted in the laboratory for each of the preferred formulations given by placing 1500 g. of filler into a jacketed Beken laboratory sigma arm mixer together with the indicated quantity of compatibilising agent. Heating was applied and mixing continued for approximately one hour by which time the mix temperature rose to approximately 80° C. At this time all other ingredients were added to the pre-blend, the top weight (dead weight ram) was applied and mixing proceeded to where the compound was fluxed. This compound was then sheeted out a laboratory two-roll mill.

To test the relevance of the laboratory trials to actual production selected formulations, e.g. Example 6 (ii) were additionally prepared by placing 100 kg. of filler in a ribbon blender which is capable of being heated. The heater and the mixer motor were turned on and the required quantity of compatibilising agent added slowly to the rotating mix. Mixing and heating proceeded for one hour by which time the mixing temperature was approximately 90° C. The pre-blend so formed was dumped into open containers for later use in manufacture of sheet or pad, sometimes immediately and other times days, weeks or even months later. No significant differences in results were noted whichever mixing method was adopted and whether the pre-blend was used immediately or only after standing for up to several months before further processing.

EXAMPLE 1

| Ingredient | Weight Percentage Range | Preferred |
|---|---|---|
| Calcium carbonate | 40–90 | 79.4 |
| Riconoleic acid LAV | 0.1–5 | 1.2 |
| PVC copolymer | 0–15 | 6.4 |
| Basic lead sulphate | 0.3–1.5 | 0.8 |
| Nitrile rubber | 0–15 | 4.2 |
| Oxalic acid | 0–0.5 | 0.16 |
| Pine rosin | 4–10 | 7.9 |

This preferred formulation was found to exhibit 80% hot slump, good toughness and excellent sound deadening efficiency.

EXAMPLE 2

| Ingredient | Weight Percentage Range | Preferred |
|---|---|---|
| Calcium carbonate | 40–90 | 79.1 |
| Riconoleic acid LAV | 0.1–5 | 1.2 |
| PVC copolymer | 0–15 | 6.3 |
| Basic lead sulphate | 0.3–1.5 | 0.6 |
| Nitrile rubber | 0–15 | 4.2 |
| Oxalic acid | 0–0.5 | 0.16 |
| Pine rosin | 4–10 | 8.4 |
| Irganox 565 | 0–1 | 0.03 |

This preferred formulation showed 100% hot slump, good toughness and similar sound deadening efficiency to that of Example 1.

EXAMPLE 3

| Ingredient | Weight Percentage Range | Preferred |
|---|---|---|
| Calcium carbonate | 40–90 | 81.4 |
| Riconoleic acid LAV | 0.1–5 | 1.2 |
| PVC copolymer | 0–15 | 6.5 |
| Basic lead sulphate | 0.3–1.5 | 1.5 |
| Nitrile rubber | 0–15 | 4.3 |
| Coumerone indene resin | 0–0.5 | 4.9 |
| Irganox 565 | 0–0.5 | 0.03 |

This preferred formulation showed 50% hot slump, good toughness and has good sound deadening in the region between 30° and 55° C. making it suitable for dishwasher application.

EXAMPLE 4 (i)

| Ingredient | Weight Percentage Range | Preferred |
|---|---|---|
| Calcium carbonate | 40–90 | 79.8 |
| Riconoleic acid LAV | 0.1–5 | 1.5 |
| PVC copolymer | 0–15 | 6.4 |
| PVC heat stabiliser | 0.3–1.5 | 1.1 |
| Nitrile rubber | 0–15 | 4.3 |
| Oxalic Acid | 0–0.5 | 0.0 |
| Pine rosin | 4–10 | 6.9 |
| Irganox 565 | 0–1 | 0.03 |

This preferred formulation 4 (i) was found to have 100% hot slump, reasonable toughness and good sound deadening efficiency for the range 25° to 40° C. This formulation is therefore well suited to auto application for a warm climate such as Australia.

EXAMPLE 4 (ii)

| Ingredient | Weight Percentage Preferred |
|---|---|
| Calcium carbonate | 79.8 |
| Riconoleic acid LAV | 1.6 |
| PVC copolymer | 6.4 |
| PVC heat stabiliser | 1.1 |
| Nitrile rubber | 4.3 |
| Oxalic Acid | 0.0 |
| Pine rosin | 6.9 |
| Irganox 565 | 0.03 |

By slightly increasing the percentage of Riconoleic acid LAV, the temperature range for high sound deadening efficiency of Example 4(i), has been shifted downward to 18° C. to 30° C. This formulation is thus well suited to auto applications that range from warm to temperate climates.

EXAMPLE 4 (iii)

| Ingredient | Weight Percentage Preferred |
|---|---|
| Calcium carbonate | 79.4 |
| Riconoleic acid LAV | 1.6 |
| PVC copolymer | 6.4 |
| PVC heat stabiliser | 1.1 |
| Nitrile rubber | 4.2 |
| Oxalic acid | 0.5 |
| Pine rosin | 6.9 |
| Irganox 565 | 0.03 |

By using the same percentage of Riconoleic acid LAV, as in Example 4(ii) and adding oxalic acid, the temperature range for high sound deadening efficiency, has been shifted further downward to the temperature range 10° to 30° C. This formulation is thus well suited to auto applications that range from cold to temperate climates. A similar downward shift of the temperature region of highest sound deadening efficiency has been achieved with other additives such as stearic acid, calcium stearate and lubricants including waxes.

EXAMPLE 4 (iv)

| Ingredient | Weight Percentage Preferred |
| --- | --- |
| Calcium carbonate | 80.1 |
| Riconoleic acid LAV | 1.2 |
| PVC copolymer | 5.3 |
| PVC heat stabiliser | 1.1 |
| Nitrile rubber | 5.3 |
| Oxalic Acid | 0.0 |
| Pine rosin | 6.9 |
| Irganox 565 | 0.03 |

By decreasing the percentage of Riconoleic acid, changing the quantity of calcium carbonate and the ratio of PVC to NBR the temperature range for high sound deadening efficiency has been shifted upwards to between 30° and 50° C. This formulation is thus well suited to dishwashing machine application.

EXAMPLE 5

| Ingredient | Range | Preferred |
| --- | --- | --- |
| Calcium carbonate | 40–90 | 79.3 |
| Riconoleic acid LAV | 0.1–5 | 1.6 |
| PVC copolymer | 0–15 | 6.4 |
| PVC heat stabiliser | 0.3–1.5 | 1.1 |
| Neoprene rubber | 0–15 | 4.8 |
| Kolon 90 | 4–10 | 6.9 |
| Irganox 565 | 0–1 | 0.03 |

This preferred formulation has reduced slump and was found to exhibit good sound deadening efficiency at around 21° C. but is more expensive than previous formulations for little apparent advantage.

EXAMPLE 6 (i)

| Ingredient | Range | Preferred | |
| --- | --- | --- | --- |
| Filler | 40–93 | 89.0 | (calcium carbonate) |
| Riconoleic acid LAV | 0.1–5 | 1.3 | |
| Nitrile rubber | 0–15 | 4.2 | |
| Atactic polypropylene | 0–5 | 1.2 | |
| Polar additive | 0–0.5 | 0.0 | |
| Pine rosin | 3–10 | 4.3 | |
| Irganox 565 | 0–1 | 0.03 | |

The above preferred formulation contains no PVC, is low in cost and displayed excellent toughness but poor hot slump. This formulation shows very good sound deadening efficiency in the region of 25° C. Such a formulation is interesting for roof decking.

EXAMPLE 6 (ii)

| Ingredient | Weight Percentage Preferred |
| --- | --- |
| Calcium carbonate | 88.9 |
| Riconoleic acid LAV | 1.2 |
| Nitrile rubber | 5.3 |
| Atactic polypropylene | 0.0 |
| Oxalic acid | 0.3 |
| Pine rosin | 4.3 |
| Irganox 565 | 0.03 |

The preferred formulation contains no PVC, is low in cost and displays excellent toughness but poor hot slump. This formulation shows very good lower temperature sound deadening efficiency down to 15° C. Such a formulation is interesting where PVC is not desirable or where low temperature sound deadening performance is required.

EXAMPLE 6 (iii)

| Ingredient | Weight Percentage Preferred |
| --- | --- |
| Calcium carbonate | 88.7 |
| Riconoleic acid LAV | 1.2 |
| Nitrile rubber | 5.3 |
| Atactic polypropylene | 0.0 |
| Phthalic anhydride | 0.6 |
| Pine rosin | 4.3 |
| Irganox 565 | 0.03 |

This preferred formulation employs phthalic anhydride in a non PVC containing sound deadening material. It is also low in cost, and displayed good toughness but poor hot slump. This formulation shows good sound deadening efficiency at lower temperatures.

EXAMPLE 6 (iv)

| Ingredient | Weight Percentage Preferred |
| --- | --- |
| Calcium carbonate | 69.7 |
| Alumina tri-hydrate | 19.0 |
| Riconoleic acid LAV | 1.2 |
| Nitrile rubber | 5.3 |
| Atactic polypropylene | 0.0 |
| Oxalic acid | 0.6 |
| Pine rosin | 4.1 |
| Irganox 565 | 0.03 |

This preferred formulation is a flame retardant variation of Example 6 (ii) and displayed similar properties.

EXAMPLE 7

| Ingredient | Range | Preferred |
| --- | --- | --- |
| Calcium carbonate | 40–90 | 81.2 |
| Riconoleic acid LAV | 0.1–5 | 1.2 |
| Chlorin.polyethylene | 2–15 | 3.7 |
| Nitrile rubber | 0–15 | 7.5 |
| Oxalic acid | 0–0.5 | 0.2 |

-continued

| Ingredient | Weight Percentage | |
|---|---|---|
| | Range | Preferred |
| Pine rosin | 4–10 | 5.4 |
| Basic lead sulphate | 0.3–1.5 | 0.8 |

The preferred formulation contains chlorinated polyethylene and displayed good sound deadening efficiency in the region of 30° C. However is more expensive than some other formulations of similar sound deadening efficiency.

While it has been convenient to describe the invention herein in relation to particularly preferred embodiments and examples, it is to be appreciated that various modifications, alterations and/or additions to the embodiments and examples described herein may be made within the scope and ambit of the present invention, as defined by the claims.

I claim:

1. A sheet or pad of heat fusible thermoplastic sound deadening material which contains no bitumen and no asphalt, said sheet or pad comprising:
   (a) a polymeric component;
   (b) a filler pre-treated with a compatibilising agent, wherein said compatibilising agent is ricinoleic acid; and
   (c) a tackifier.

2. A sheet or pad according to claim 1, wherein said compatibilising agent is ricinoleic acid LAV.

3. A sheet or pad according to claim 2, wherein said polymeric component comprises an elastomer comprising a natural or synthetic rubber.

4. A sheet or pad according to claim 3, wherein said elastomer comprises nitrile rubber, butyl rubber, ethylene propylene rubber, polychloroprene, polysulphide rubber or styrene butadiene rubber.

5. A sheet or pad according to claim 2, wherein said polymeric component comprises polyvinyl chloride, chlorinated polyethylene or ethylene vinyl acetate copolymer.

6. A sheet or pad according to claim 2, wherein said polymeric component is present in an amount not greater than about 18% by weight of the total weight of the material.

7. A sheet or pad according to claim 6, wherein said polymeric component is present in an amount in the range of from 3 to 12% by weight of the total weight of the material.

8. A sheet or pad according to claim 2, wherein said compatibilising agent is present in an amount in the range of from 0.1 to 5% by weight of the total weight of the material.

9. A sheet or pad according to claim 2, wherein said tackifier is present in an amount in the range of from 2 to 9% by weight of the total weight of the material.

10. A sheet or pad according to claim 1, wherein said filler is selected from the group consisting of calcium carbonate, barytes, talc, mica, magnesium carbonate, silica and mixtures thereof.

11. A sheet or pad according to claim 10, wherein said filler comprises calcium carbonate.

12. A sheet or pad according to claim 10, wherein said filler is present in an amount in the range of from 60 to 90% by weight of the total weight of the material.

13. A method for forming a heat fusible thermoplastic sound deadening material according to claim 1 comprising the steps of:
   compatibilising a filler by treatment with ricinoleic acid to form a pre-blend;
   mixing the pre-blend with other ingredients including a polymeric component and a tackifier to form a mix; and
   forming a sheet or pad from said mix.

14. A method according to claim 13, wherein said filler comprises calcium carbonate.

15. A method according to claim 13, wherein said polymeric component comprises an elastomer.

16. A method according to claim 13, wherein said polymeric component comprises polyvinyl chloride, chlorinated polyethylene or ethylene vinyl acetate copolymer.

17. A method for applying a heat fusible thermoplastic sound deadening material according to claim 1 to a metal panel comprising the steps of:
   forming a sheet or pad of sound deadening material by compatibilising a filler by treatment with ricinoleic acid to form a pre-blend, mixing the pre-blend with other ingredients including a polymeric component and a tackifier to form a mix, and forming said sheet or pad from said mix;
   laying said sheet or pad on a metal panel; and
   heating said metal panel and said sheet or pad whereby to bond said sheet or pad to said metal panel.

18. A method according to claim 17, wherein said filler comprises calcium carbonate.

19. A method according to claim 17, wherein said polymeric component comprises an elastomer.

20. A method according to claim 17, wherein said polymeric component comprises polyvinyl chloride, chlorinated polyethylene or ethylene vinyl acetate copolymer.

21. A sheet or pad of heat fusible thermoplastic sound deadening material which contains no bitumen and no asphalt, said sheet or pad comprising:
   (a) a polymeric component selected from the group consisting of nitrile rubber, polyvinyl chloride polymers, polyvinyl chloride copolymers and mixtures thereof;
   (b) a filler comprising calcium carbonate pre-treated with a compatibilising agent, wherein said compatibilising agent is ricinoleic acid; and
   (c) a tackifier.

22. A sheet or pad according to claim 21, wherein said compatibilising agent is ricinoleic acid LAV.

23. A sheet or pad according to claim 22, wherein said tackifier comprises a pine rosin.

24. A sheet or pad according to claim 22, wherein said compatibilising agent is present in an amount of from 0.1 to 5% by weight of the total weight of the material.

25. A sheet or pad according to claim 22, wherein said polymeric component is present in an amount not greater than about 18% by weight of the total weight of the material.

26. A sheet or pad according to claim 25, wherein said polymeric component is present in an amount in the range of from 3 to 12% by weight of the total weight of the material.

27. A sheet or pad according to claim 22, wherein said filler is present in an amount in the range of from 60 to 90% by weight of the total weight of the material.

28. A sheet or pad according to claim 22, wherein said tackifier is present in an amount in the range of from 2 to 9% by weight of the total weight of the material.

29. A sheet or pad according to claim 22 which further includes a polar additive comprising a carboxylic acid or anhydride thereof.

30. A sheet or pad according to claim 29, wherein said polar additive is selected from the group consisting of oxalic acid, phthalic acid, malonic acid and anhydrides thereof.

31. A sheet or pad of heat fusible thermoplastic sound deadening material which contains no bitumen and no asphalt comprising:

|  | wt. % |
| --- | --- |
| PVC and/or nitrile rubber | 3–30 |
| Ricinoleic Acid | 0.1–5 |
| Calcium Carbonate | 40–90 |
| Alumina Trihydrate | 0–30 |
| Pine Rosin | 4–10 |
| Oxalic Acid | 0–0.5 |
| Anti-oxidant | 0–1 |
| Lubricant | 0–4 | and wherein said calcium carbonate is pre-treated with said ricinoleic acid.

32. A sheet or pad according to claim 31 which further includes a heat stabilizer in an amount of 0.3 to 1.5% by weight when PVC is present in the sheet or pad.

33. A sheet or pad according to claim 31, wherein said ricinoleic acid comprises ricinoleic acid LAV.

34. A sheet or pad according to claim 31, wherein said lubricant is selected from the group consisting of waxes, stearic acid and calcium stearate.

* * * * *